United States Patent [19]

Weisburn et al.

[11] Patent Number: 5,383,557
[45] Date of Patent: Jan. 24, 1995

[54] CASSETTE STORAGE CONTAINER WITH HUB ENGAGING FINGERS AND ADJACENT STOPS

[75] Inventors: James T. Weisburn, Massillon; James K. Sankey, Hudson, Ohio; Andrew W. Moock, Brecksville, all of Ohio

[73] Assignee: Alpha Enterprises, Inc., North Canton, Ohio

[21] Appl. No.: 682,967

[22] Filed: Apr. 10, 1991

[51] Int. Cl.⁶ .......................................... B65D 85/672
[52] U.S. Cl. .................................. 206/387.13; 206/493
[58] Field of Search ................. 206/387, 493, 307, 1.5, 206/444

[56] References Cited

U.S. PATENT DOCUMENTS

| | | | |
|---|---|---|---|
| 3,896,929 | 7/1975 | Mills | 206/387 |
| 4,056,244 | 11/1977 | Matsutsuka | 206/387 |
| 4,078,657 | 3/1987 | Schurman | 206/387 |
| 4,184,594 | 1/1980 | Hehn | 206/387 |
| 4,230,225 | 10/1980 | Okada et al. | 206/387 |
| 4,231,474 | 11/1980 | Takahashi | 206/387 |
| 4,291,801 | 9/1981 | Basili et al. | 206/387 |
| 4,365,711 | 12/1982 | Long et al. | 206/387 |
| 4,428,482 | 1/1984 | Ogawa | 206/387 |
| 4,593,814 | 6/1986 | Hagiwara et al. | 206/387 |
| 4,614,269 | 9/1986 | Dietze et al. | 206/387 |
| 4,753,347 | 6/1988 | Bellante et al. | 206/387 |
| 4,793,479 | 12/1988 | Otsuka et al. | 206/310 |
| 4,871,064 | 10/1989 | Hehn et al. | 206/387 |
| 4,928,825 | 5/1990 | Hehn | 206/387 |

Primary Examiner—Paul T. Sewell
Assistant Examiner—Thomas P. Hilliard
Attorney, Agent, or Firm—Michael Sand Co.

[57] ABSTRACT

A container for storing a tape cassette of the type having a pair of spaced tape reel hubs. Each hub has a cylindrical sidewall which defines a recess in the hub. The storage container includes enclosure means for receiving and enclosing a cassette in the container. Diametrically opposed pairs of fingers are molded integrally with a bottom wall of the container and project into the hub recess through an aligned access opening formed in a bottom wall of the tape cassette upon placing the cassette into the container. The fingers are formed with a convex outer camming surface and are connected to the container by a straight leg portion. The convex outer edges of the fingers are engaged by the hub sidewalls and flex inwardly upon initial placement of the cassette into the storage container. A rigid stop member is mounted adjacent to and inwardly of each of the flexible fingers to limit the inward movement of the fingers toward the flexed position to control the flex thereof and to prevent breakage of the fingers. The stop members are connected by intervening reinforcing ribs to form a rigid stop assembly.

18 Claims, 2 Drawing Sheets

CASSETTE STORAGE CONTAINER WITH HUB ENGAGING FINGERS AND ADJACENT STOPS

BACKGROUND OF THE INVENTION

1. Technical Field

The invention relates to containers, and in particular to containers for storing video cassettes. More particularly, the invention relates to a storage container which is adapted to receive and enclose a video cassette and which prevents rotation of the tape reel hubs housed within the cassette.

2. Background Information

The use of video cassettes together with associated equipment, such as video cassette recorders, continues to grow in popularity. One type of cassette is used primarily by individuals to record programs directly from a television or for videotaping of live events for replay at a later time, or alternatively, is rented or purchased with a program already prerecorded thereon. Another type of video cassette is used primarily for commercial purposes, and houses a magnetic tape having a three-quarter inch width format, which is significantly wider than the half-inch tape format present in cassettes of the type used by individuals.

It is desirable that these cassettes be shipped and stored in protective boxes or containers to prevent physical damage to the cassette during shipment, as well as to keep the cassette relatively dust-free during storage. It also is desirable that the tape reel hubs of these cassettes, and especially those of the larger tape format, be prevented from rotating during shipment caused by vibrations resulting from transport. Such rotation can cause the tape in the cassette to unwind from the hubs, often resulting in damage to the unwound portion of tape and loss of the information stored thereon.

Many of the cassette storage containers disclosed in the known prior art utilize one or more buttons or pins which engage drive holes formed in the tape reel hubs to prevent the hubs from rotating, as shown in U.S. Pat. Nos. 3,876,071; 4,011,940; 4,054,206; 4,078,657; and 4,231,474. Although such storage containers limit the rotation of the cassette hubs, some rotation usually is necessary for moving the drive holes into alignment with the retention pins. Thus, damage to the small portion of the tape which unwinds from such rotation still can occur. U.S. Pat. No. 4,245,740 shows another cassette storage container in which a pin engages one of the drive holes in each of the tape reel hubs directly and immediately upon insertion of the cassette into the container.

U.S. Pat. No. 4,428,482 shows another prior art storage container having vertical fins attached to a projection which fit into grooves of the hub recess of a cassette. However, the container shown in this prior art patent is not intended to prevent rotation of cassette tape reel hubs which lack teeth or grooves.

U.S. Pat. No. 4,291,801 discloses another storage container having upstanding flexible fingers which are arranged in a circular arrangement which effect an interference fit between the access opening in the bottom of the cassette for fixedly locating and holding the cassette within the container. However, the fingers do not engage the cylindrical wall of the tape reel hub and are not intended to prevent the hub reels from locating.

The closest known prior art to applicant's invention is shown in U.S. Pat. No. 4,593,814. However, the device of this patent requires rigid positioning means formed intermediate a plurality of flexible fingers for accurately positioning the cassette, so that the flexible fingers properly engage a cylindrical sidewall of the hub. However, one disadvantage which is believed present in the retaining device of this patent is that the particular arrangement of the positioning members and flexible fingers are difficult to mold, and that the flexible fingers are not adequately protected from possible breakage.

U.S. Pat. No. 4,928,825 discloses another hub retaining device which provides a friction fit with the sidewall of the tape reel hub. Although the device of this patent is satisfactory for most applications, it is desirable to be able to provide greater flexibility to the retaining fingers and at the same time provide greater protection for the fingers from physical damage.

In order to be competitive in the video cassette container field, it is necessary to mass produce the containers at as low a cost as possible. These containers usually are injection molded of plastic, preferably in one piece, with the tape reel retention device being integrally molded with the container in a single procedure and at the same time to reduce costs. Use of a relatively simple mold is preferred in molding such containers, that is, a mold not having any or as few as possible moving parts to reduce molding time, as well as to reduce the cost of manufacture and maintenance of the molds. Many of the prior art containers containing hub retention devices require a complicated mold containing moving parts, all of which increases the cost of manufacture of the container.

There is no storage container for video cassettes of which we are aware, other than our invention set forth below, which prevents rotation and rattling of the tape reel hubs of a cassette by using a plurality of flexible fingers in cooperation with associated rigid stop means to control the flex of the fingers and to prevent breakage of the fingers, and which can be molded in a simple injection mold.

SUMMARY OF THE INVENTION

Objectives of the present invention include providing an improved cassette storage container which prevents rotation of the tape reel hubs of a cassette when the cassette is placed in the container for storage, so that unwinding of and possible damage to the tape contained within the cassette is avoided. Another objective is to provide such an improved storage container which prevents rattling and other movement of the tape reel hubs in the cassette.

A further objective of the present invention is to provide such an improved storage container which properly positions the cassette in the container and prevents lateral movement of the cassette therein, and which prevents rotation of the reel hubs immediately upon engagement with the hubs without requiring limited rotation of the hubs to provide alignment between pins and drive holes as in some prior art retaining hubs.

Still another objective of the present invention is to provide such an improved storage container which securely grasps the cassette to prevent it from tumbling out of the storage container upon opening thereof, even if opened incorrectly.

Another objective of the present invention is to provide both a shipping and storage container for cassettes which prevents physical damage to the cassettes during shipment, and provides storage in a relatively dust-free container.

A further objective of the invention is to provide such a storage container in which the prevention of hub rotation is accomplished by a frictional, generally elongated contact with the hub wall of the tape reel rather than a point contact as in prior hub retention devices, and which is relatively unaffected by small variations in the diameter of the hub.

Still another objective of the invention is to provide such a storage container in which rigid stops are provided adjacent the flexible retaining fingers to control the flex of the hub retaining fingers and to prevent breakage of the fingers.

These objectives and advantages are obtained by the improved cassette storage container of the invention, the general nature of which may be stated as a container of the type for storing a tape cassette having at least one tape reel hub with a cylindrical sidewall defining a recess in the hub, the hub recess being accessible through an opening formed in a bottom wall of the cassette, the storage container further including enclosure means for receiving and enclosing a tape cassette in the storage container; and hub engaging means formed on the storage container and located for entering the hub recess through the access opening when a cassette is placed in the container for preventing rotation of the tape reel hub, the hub engaging means including at least one pair of flexible fingers formed on the storage container and movable between a normal outwardly biased position and an inwardly flexed position for engaging the sidewall of the hub when in the outward biased position to prevent rotation of the hub when the cassette is inserted into the storage container; and rigid stop means located inwardly of and closely adjacent to each of said fingers to limit the inward movement of said fingers toward the flexed position.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
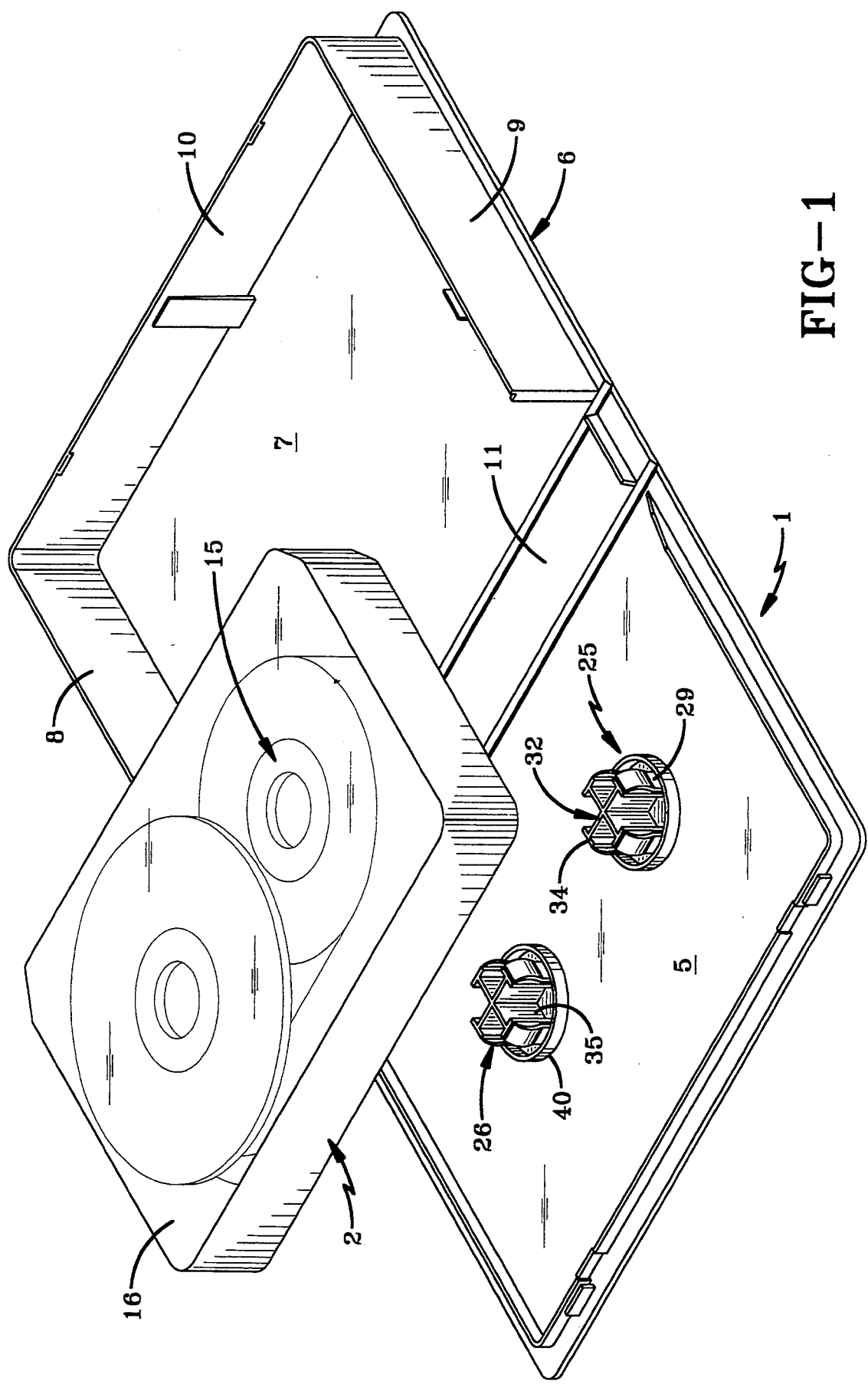
FIG. 1 is a perspective view showing the improved self-locking finger assembly of the present invention incorporated into a video cassette storage container, with a video cassette being shown just prior to placement in the container.

The improved cassette storage container of the present invention is indicated generally at 1, and is shown in FIG. 1 in an open position prior to receiving and enclosing therein a video cassette, indicated generally at 2. Storage container 1 has a rectangular box-shaped configuration which forms a hollow enclosure when closed, and preferably is formed of a molded plastic material such as polypropylene. Container 1 includes a rectangular-shaped flat bottom wall 5 and a rectangular-shaped lid 6. Lid 6 includes a top closure wall 7 similar in size and shape to bottom wall 5, and upstanding parallel end walls 8 and 9 and a front wall 10. Walls 8, 9 and 10 are formed integrally with top wall 7 and are arranged in a U-shaped configuration to enclose three sides of bottom wall 5 when in the closed position. Lid 6 is movably mounted on bottom wall 5 by a double-hinged panel 11 for pivotal movement between open and closed positions.

Video cassette 2 (FIG. 1) is of the type having a pair of spaced tape reel hubs, indicated generally at 15, mounted within the cassette, which hubs have a magnetic tape 16 wound thereon. Each tape reel hub 15 (FIG. 2) includes a bottom wall 17 and a cylindrical sidewall 18 which defines a recess 19 in the hub. A pair of spaced access openings 20 are formed in a bottom wall 21 of cassette 2, each of which is generally aligned with a respective one of the hub recesses 19.

Figure 2:
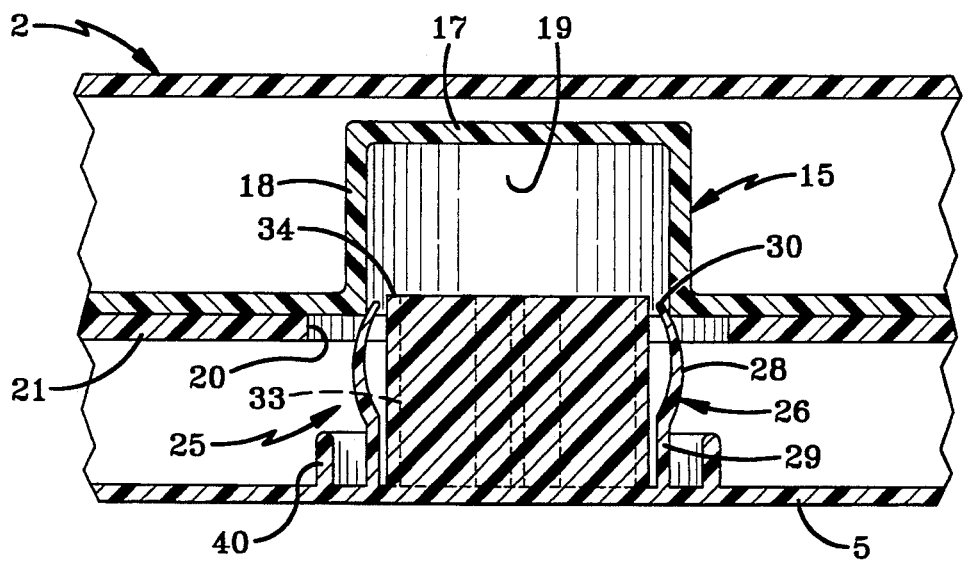
FIG. 2 is an enlarged fragmentary sectional view showing the improved self-locking finger assembly beginning to be engaged by one of the tape reel hubs of the video cassette.
Figure 3:
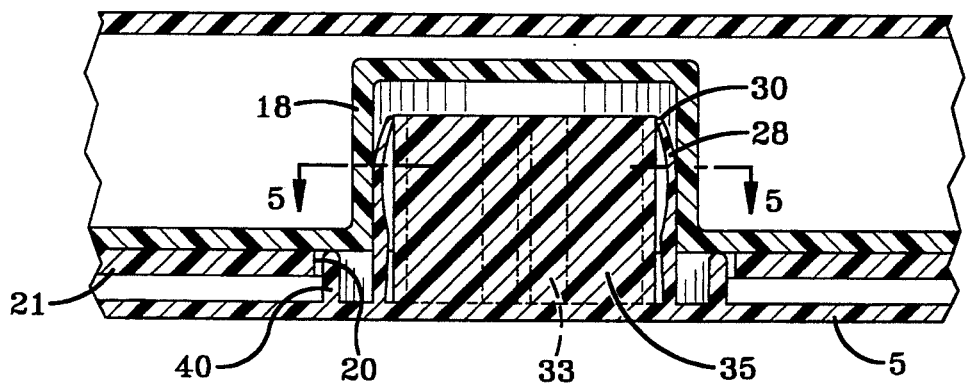
FIG. 3 is an enlarged fragmentary sectional view similar to FIG. 2, showing the self-locking finger assembly fully engaged with the tape reel hub of the video cassette.

In accordance with a main feature of the invention, a pair of self-locking finger assemblies, each indicated generally at 25, is located in a spaced relationship on bottom wall 5 of container 1, as shown in FIG. 1. Finger assemblies 25 project outwardly from the inside surface of bottom wall 5 and are located to project through cassette access openings 20 and into hub recesses 19 when cassette 2 is placed in container 1 (FIGS. 2 and 3). Since the construction and operation of each finger assembly 25 is similar, only one of the assemblies is described in detail.

Finger assembly 25 is formed integrally with container wall 5 and thus of the same plastic material. Assembly 25 in the preferred embodiment, includes four fingers 26 spaced 90° apart, so that each finger is positioned in diametrically opposed relationship to one of the other fingers as shown particularly in FIGS. 4 and 5. Each finger 26 is an upstanding member formed with a convex upper portion 28 and a generally straight leg portion 29, which is formed integrally with bottom wall 5 and extends generally perpendicularly upwardly therefrom. Convex top portion 28 terminates in a straight top edge 30. Finger assembly 25 forms an imaginary circle having a diameter slightly greater than the inside diameter of cylindrical sidewall 18 of the hub when the fingers are in the normal biased position.

In accordance with another of the features of the invention, a stop assembly indicated generally at 32, is located within an imaginary circle defined by outer fingers 26. Stop assembly 32 includes a plurality of vertically extending generally flat stop members 33. Each stop member 33 has a width generally equal to the width of each member 26 (FIGS. 4 & 5), and has a top edge 34 which is located generally adjacent and slightly above, and extends along top edge 30 of each finger 26. Top edge 30 preferably aligns vertically with straight leg portion 29 as shown in FIG. 2. The height of stop member 33 is at least equal to and preferably slightly greater than the height of each finger 26 as shown particularly in FIGS. 2 and 3. Likewise the spacing between the outside surfaces of straight leg portions 29 is generally equal to or slightly less than the inside diameter of hub wall 18 as shown in FIG. 3.

Figure 4:
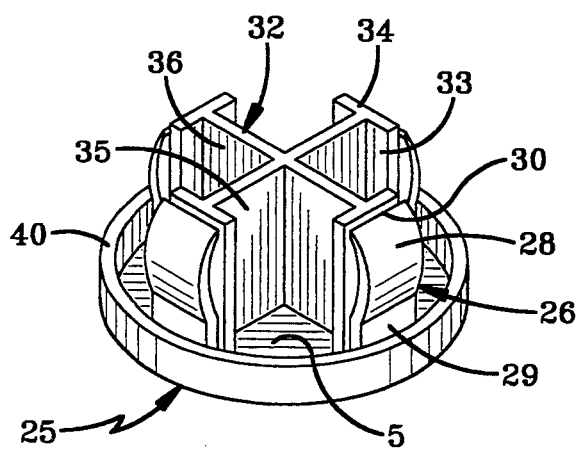
FIG. 4 is an enlarged perspective view of one of the self-locking finger assemblies removed from the cassette container.
Figure 5:
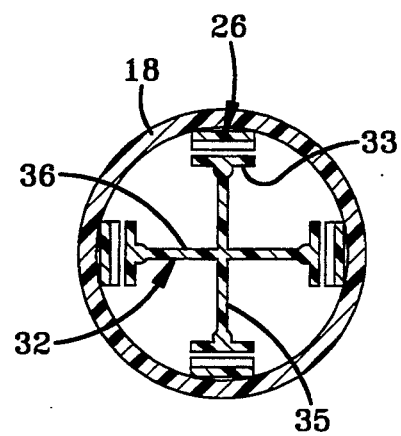
FIG. 5 is an enlarged fragmentary sectional view taken on line 5—5, FIG. 3.

Each pair of diametrically opposed stop members 33 is connected by a diagonally extending reinforcing rib 35 and 36, which are formed integrally with their respective end stop members, and which are joined in the center to form an X-shaped configuration as shown particularly in FIGS. 4 and 5. Reinforcing ribs 35 and 36 are also formed integrally with bottom wall 5 of the storage container.

In accordance with an important feature of the invention, the combination of stop members 33 and their associated reinforcing ribs, limit the inward flexing movement of the flexible fingers, enabling the fingers to flex inwardly only a sufficient amount to permit the cassette reel hub to slide over and along the curved camming surfaces 28 of the fingers, as shown particularly in FIG. 3. In addition to limiting the amount of flex of the fingers, stop members 33 prevent breakage of the fingers. As seen in FIGS. 4 and 5, fingers 26 can move inwardly only a very slight amount approximately, $\frac{1}{8}$ of an inch, which is sufficient to permit the tape reel hub to slide over and along the flexed fingers. When tape reel hub 15 is in the full engaged position (FIG. 3), upper edges 30 of the fingers engage stop members 33 preventing further inward movement, while permitting the curved surfaces 28 thereof to frictionally engage hub sidewall 18 of the hub reel to prevent rotation thereof. Stop members 33 enable the container and in particular flexible fingers 26 thereof, to absorb jolts and impacts, such as upon dropping of the cassette, without damaging the flexible fingers, since the fingers are retained in their flexed position between the hub reel cylindrical wall and the adjacent stop member 33.

Although two opposed pairs of flexible fingers and their associates stop members, each spaced 90° apart, are shown in the drawings and described above, it is readily understood that other combinations may be utilized. For example, a single pair of diametrically opposed fingers and connecting stop assembly would be satisfactory, as well as three fingers and stop members spaced 120° apart, without affecting the concept of the invention.

An upstanding annular member 40 is formed integrally with bottom wall 5 of container 1, and encircle each finger assembly 25. Annular member 40 is of the type presently used on many known cassette storage containers for generally positioning a cassette within the container and limiting lateral movement of the cassette therein. Each annular member 40 is located to project into a respective access opening 20 of cassette 2 as shown in FIG. 3, and will engage bottom wall 21 when the cassette is placed in the storage container.

In its intended use, a cassette 2 is placed into improved storage container 1 as shown in FIG. 1 whereby each access opening 20 of the cassette is manually aligned with a respective one of the finger assemblies 25 of the container. Upon initial placement of the cassette in the storage container as illustrated in FIG. 2, the cassette is moved toward bottom wall 5 and fingers 26 of each finger assembly 25, will pass through access opening 20 and into hub recess 19. Upper convex portion 28 of each finger 26, serves as a camming surface which is engaged by cylindrical sidewall 18 of tape reel hub 15, for moving the fingers towards their inwardly flexed position whereupon top edge 30 of each finger engages flat stop member 33 to control the flexing of the fingers. The cylindrical sidewall of the tape reel hub continues to move downwardly in sliding frictional engagement with outer convex upper portion 28 until bottom wall 21 of the cassette contacts bottom wall 5 of the container, with annular member 40 engaging the bottom wall of the tape reel hub as shown in FIG. 3. The inwardly compressed upper portions 28 of the fingers are trapped between stop members 33 and the cylindrical wall of the hub and attempt to flex outwardly to their normal biased position providing a firm frictional interference fit with the hub to prevent rotation thereof.

Although the finger assemblies which are formed integrally with improved cassette storage container 1, are intended primarily for use with the commercial three-quarter inch tape format, such features and operation can be incorporated into a storage container used for the one-half inch tape format. Also, the finger assemblies can be incorporated into containers for use in applications other than video tapes, such as audio tapes, movie film reels or other apparatus in which the prevention of rotation of a member having a hub recess is desired. Thus, the invention need not be limited to video tapes.

Another important feature of the present invention is that the stop assemblies 32 and finger assemblies 25 can be molded integrally and concurrently with the storage container eliminating additional manufacturing assembly of the fingers and/or storage containers.

In summary, the improved cassette storage container is inexpensive to manufacture, rugged, easy to use, and effectively prevents rotation of the tape reel hubs of a cassette so that the magnetic tape contained therein remains wound on the hubs and undamaged during shipping and storage. The improved container also prevents rattling and other undesirable movement of the hubs, as well as lateral movement of the cassette within the container. The container additionally provides a dust-free environment for storage of the cassette and prevents physical damage to the cassette during shipment. Finally, the finger assemblies of the container prevent a cassette from tumbling out of the container upon opening thereof, even if opened incorrectly.

Accordingly, the improved cassette storage container is simplified, provides an effective, safe, inexpensive, and efficient device which achieves all of the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cassette storage container is constructed and used, the characteristics of the construction, and the advantageous, new and useful results obtained; the new and useful structures, devices, elements, arrangements, parts, and combinations, are set forth in the appended claims.

What is claimed is:

1. A container for storing a tape cassette, said cassette being of the type having at least one tape reel hub comprising a cylindrical sidewall defining a recess in the hub, said hub recess being accessible through an opening formed in a bottom wall of the cassette, said storage container including enclosure means for receiving and enclosing a tape cassette in the storage container; and hub engaging means formed on the storage container and located for entering the hub recess through the access opening when a cassette is placed in said container for preventing rotation of the tape reel hub; said hub engaging means including at least a first pair of flexible fingers formed on the storage container and movable between a normal outwardly biased position and an inwardly flexed position for engaging the sidewall of the hub when in the outward biased position to prevent rotation of the hub when the cassette is inserted into the storage container; and rigid first stop means located inwardly of and closely adjacent to each of said fingers and in general radial alignment with said fingers to limit the inward movement of said fingers toward the flexed position by engaging said fingers upon the inward movement of the fingers.

2. The container defined in claim 1 in which each of the fingers includes an outwardly convexly curved upper portion which serves as a camming surface for moving the finger toward the flexed position upon initial placement of a cassette into the storage container and into engagement with the sidewall of the tape reel hub.

3. The container defined in claim 2 in which each of the convex camming surfaces is connected to the storage container by a generally straight leg portion which is connected to and extends generally perpendicularly outwardly from the container, 4. The container defined in claim 1 in which the stop means is a generally flat member extending perpendicularly outwardly from the container a distance generally equal to the outward extension of said finger.

5. The container defined in claim 4 in which the fingers are spaced approximately 180° apart; and in which the flat members of the stop means are connected by a reinforcing rib extending therebetween.

6. The container defined in claim 5 in which a second pair of flexible fingers are located between said one pair of fingers and located 90° therefrom.

7. The container defined in claim 6 in which said first and second pairs of fingers form an imaginary circle having a diameter slightly greater than the diameter of the cylindrical sidewall of the hub when the fingers are in the normal biased positions.

8. The container defined in claim 6 in which second stop means are located adjacent to and inwardly of each of the second pair of flexible fingers to limit inward movement thereof.

9. The container defined in claim 8 in which a second reinforcing rib extends between the second stop means and extends perpendicularly to the reinforcing rib of the first stop means.

10. The container defined in claim 8 in which the second stop means are similar to the first stop means.

11. The container defined in claim 9 in which the first and second stop means and reinforcing ribs form a rigid integral one-piece member.

12. The container defined in claim 1 in which positioning means is formed on the storage container and projects into the access opening when a cassette is placed into the storage container for positioning the cassette in the storage container.

13. The device defined in claim 12 in which the positioning means is an annular member formed integrally with the storage container and encircles the pair of fingers.

14. The container defined in claim 3 in which the camming surface of each of the fingers terminates in a top edge; and in which said top edge is aligned vertically with the straight leg portion of said finger.

15. The container defined in claim 14 in which the width of the fingers is generally equal to the width of the flat member of the stop means.

16. The container defined in claim 14 in which the top edge of each of the fingers engages the stop means when in the flexed position.

17. The container defined in claim 3 in which the spacing between outside surfaces of the straight leg portions of the fingers is generally equal to or slightly less than the diameter of the cylindrical wall of the hub.

18. A container for storing an item, said item being of the type having at least one rotatable hub comprising a cylindrical sidewall defining a recess in the hub, said hub recess being accessible through an opening formed in a bottom wall of the item, said storage container including enclosure means for receiving and enclosing the item in the storage container; and hub engaging means formed on the storage container and located for entering the hub recess through the access opening when the item is placed in said container for preventing rotation of the hub; said hub engaging means including at least a first pair of flexible fingers formed on the storage container and movable between a normal outwardly biased position and an inwardly flexed position for engaging the sidewall of the hub when in the outward biased position to prevent rotation of the hub when the item is inserted into the storage container; and rigid first stop means located generally radially inwardly of and closely adjacent to each of said fingers to limit the inward movement of said fingers toward the flexed position by abuttingly engaging said fingers upon the inwardly movement of said fingers.

* * * * *